(12) United States Patent
Small et al.

(10) Patent No.: US 11,002,011 B2
(45) Date of Patent: May 11, 2021

(54) METAL FRAMING CONSTRUCTION COMPONENTS HAVING MEASUREMENT INDICIA

(71) Applicant: Telling Industries, LLC, Willoughby, OH (US)

(72) Inventors: Jon Daniel Small, Naples, FL (US); Charles Andrew Haba, Kirtland, OH (US); Thomas Dwayne Ogle, York, SC (US)

(73) Assignee: Telling Industries, TTC, Willoughby, OH (US)

( * ) Notice: Subject to any disclaimer, the term of this patent is extended or adjusted under 35 U.S.C. 154(b) by 0 days.

(21) Appl. No.: 16/582,766

(22) Filed: Sep. 25, 2019

(65) Prior Publication Data

US 2020/0018067 A1    Jan. 16, 2020

Related U.S. Application Data

(60) Provisional application No. 62/771,837, filed on Nov. 27, 2018.

(51) Int. Cl.
*E04C 3/06* (2006.01)
*G01B 3/04* (2006.01)
*G01B 1/00* (2006.01)
*G01B 5/02* (2006.01)
*E04C 3/04* (2006.01)

(52) U.S. Cl.
CPC ........... *E04C 3/06* (2013.01); *G01B 1/00* (2013.01); *G01B 3/04* (2013.01); *G01B 5/02* (2013.01); *E04C 2003/0452* (2013.01)

(58) Field of Classification Search
CPC .... G01B 3/04; G01B 1/00; G01B 5/02; E04C 3/06; E04C 2003/0452; E04C 3/32
USPC .......................................................... 52/105
See application file for complete search history.

(56) References Cited

U.S. PATENT DOCUMENTS

| | | | | |
|---|---|---|---|---|
| 1,607,097 A | * | 11/1926 | Murphy | B43K 29/08 33/485 |
| 2,449,265 A | * | 9/1948 | Williams | F01P 11/04 138/118 |
| 2,528,211 A | * | 10/1950 | Civkin | G09B 25/04 434/80 |
| 4,573,302 A | * | 3/1986 | Caretto | E04B 1/0007 33/563 |
| 4,916,871 A | * | 4/1990 | Anderson | E04B 2/82 52/105 |
| 4,927,696 A | * | 5/1990 | Berg | G01B 3/004 428/195.1 |
| 5,632,095 A | * | 5/1997 | Day | G01B 3/04 33/483 |

(Continued)

*Primary Examiner* — Adriana Figueroa
(74) *Attorney, Agent, or Firm* — Edwin A. Sisson, Attorney at Law, LLC; Jeffrey J. Banyas (57) ABSTRACT

Described herein is a metal construction component, such as a metal framing component, which includes a metal stud, having a length, a width, and a height. The metal stud may comprise a first end, a second end opposite the first end, a first side, a second side, a third side, a first edge, and a second edge. The metal stud may also comprise an indicia comprising a plurality of indicium evenly spaced according to a measurement convention along a theoretical measurement line. The theoretical measurement line may be substantially parallel to at least one of the first edge and the second edge.

21 Claims, 4 Drawing Sheets

(56) References Cited

U.S. PATENT DOCUMENTS

| | | | | |
|---|---|---|---|---|
| 5,673,489 | A * | 10/1997 | Robell | E04C 2/043 33/1 B |
| 5,729,934 | A * | 3/1998 | Ochoa | E04G 21/18 33/407 |
| 5,768,795 | A * | 6/1998 | Jimenez | B25H 7/00 33/481 |
| 5,924,213 | A | 7/1999 | Lee | |
| 6,115,926 | A * | 9/2000 | Robell | E04C 2/043 33/1 B |
| 6,568,138 | B1 * | 5/2003 | Frost | E04B 2/767 52/241 |
| 6,679,011 | B2 * | 1/2004 | Beck | E04D 3/30 33/263 |
| 7,181,887 | B1 * | 2/2007 | Baij | E04G 21/1891 52/105 |
| 7,222,435 | B1 * | 5/2007 | Orfield | B25H 7/02 33/42 |
| 7,849,640 | B2 * | 12/2010 | Rice | E04B 2/7457 52/105 |
| 7,849,652 | B2 * | 12/2010 | Lehane | E04B 9/122 52/105 |
| 2004/0194417 | A1 * | 10/2004 | Paul | E04B 9/30 52/716.8 |
| 2006/0277841 | A1 * | 12/2006 | Majusiak | E04B 2/7457 52/105 |
| 2007/0214671 | A1 * | 9/2007 | Campagna | B43L 7/007 33/492 |
| 2008/0201975 | A1 | 8/2008 | Gingerella et al. | |
| 2011/0104418 | A1 * | 5/2011 | Fish | G01B 3/04 428/36.9 |

* cited by examiner

METAL FRAMING CONSTRUCTION COMPONENTS HAVING MEASUREMENT INDICIA

CROSS REFERENCES AND PRIORITIES

This application claims the benefit of priority of U.S. Provisional Patent Application No. 62/771,837, filed on 27 Nov. 2018; the teachings of which are incorporated by reference herein in their entirety.

BACKGROUND

Metal construction components, which includes metal studs, are usually provided in standard lengths, e.g. 12 foot, 10 foot, 9 foot or 8 foot. Some metal construction components are cut to length at the job site.

The traditional method of cutting metal construction components, such as metal studs and other metal construction components involves using a tape measure across the length of a metal construction component, marking it, then field cutting.

Not only is this method unwieldly and time consuming it can be highly inaccurate. The longer the metal construction component, the more inaccurate the measurement becomes when the tape measure is not kept exactly aligned with the edge of the metal construction component or the mark is just a little off.

Excessive variation leads to scrapping the cut metal construction component and re-cutting new pieces resulting in higher material costs, more time, and more field labor.

There exists therefore the need to have a more accurate method of measuring and cutting a metal construction component. The problems associated with using a tape measure and marking tools as noted in US200810975. As described, laying out various structures for the building industry require a tradesperson to use various tools such as a construction square, tape measure, and marking tools, to locate the desired member locations. Marking these locations is time consuming and may, depending on the size of the project, require more than one person to complete the task. The use of mechanical devices needed for the measuring and marking of a member location often lead to errors requiring rework or nonstandard installation of the members.

While US20080201975 recognizes the problems inherent with using a tape measure and marking, US2008021975 addresses these problems during the layout of the studs relative to each other. US2008021975 does not address the problem as it occurs in the cutting of the studs or metal construction component in the field.

U.S. Pat. No. 5,924,213 to Lee claims a sheet construction material being rectangular in shape comprising: a grid line of line indicia positioned on said sheet construction material, said line indicia spaced ¼-inch apart and extending from one side to the opposite side of said sheet construction material, thereby forming ¼-inch squares on said sheet construction material; a pair of numerical indicia positioned along each side of the said sheet construction material and along each line indicia that corresponds to a stud line, each of the said pair of numerical indicia comprising a consecutive ascending set of numerical indicia and a consecutive descending set of numerical indicia, said ascending and descending number indicia being in 1-inch increments.

U.S. Pat. No. 5,924,213 to Lee again teaches nothing about a technique or method which eliminates the use of a tape measure and marking when cutting a metal frame component or a metal stud.

SUMMARY

This specification discloses a metal construction component having a length and a width comprising a first end, a web having at least a first edge, a first flange, a second flange, and a first indicia comprised of a first plurality of indicium evenly spaced along a first theoretical measurement line, with the first theoretical measurement line substantially parallel to at least the first edge, and with said first theoretical measurement line beginning from the first end and extending along at least a portion of the length.

It is further disclosed that length of the metal construction component wherein the length is in a range of about 2 to about 50 feet.

It is also disclosed that the first indicia of the metal construction component has a degree of resolution between individual indicium of the first plurality of indicium and the degree of resolution is a measurement gap between the individual indicium selected from the group consisting of the metric system and the United States customary system.

The degree of resolution may be the United States customary system and the measurement gap is selected from the group consisting of one foot, one inch, one-half of an inch, one-quarter of an inch, one-eighth of an inch, and one-sixteenth of an inch.

The degree of resolution may also be the metric system and the measurement gap is selected from the group consisting of 50 centimeters, 25 centimeters, one centimeter, five millimeters, two millimeters, and one millimeter.

It is further disclosed that at least a portion of the first plurality of the indicium of the first indicia comprise hash marks oriented perpendicular to the theoretical measurement line or at least a portion of the first plurality of indicium comprise dots arranged on the theoretical measurement line, and the first indicia occur at an incremental distance from the first end of the metal construction component from where the first indicia begins.

It is further disclosed that when the indicium are hash mark, the hash mark lengths corresponding to a largest incremental distance are the same length and the hash mark lengths corresponding to a smaller incremental distance are shorter than the hash mark lengths corresponding to the hash mark lengths corresponding to the longest incremental distance.

It is also contemplated that the first theoretical measurement line extends the length of the metal construction component.

It is further disclosed that the metal construction component further comprise a second indicia arranged on a second theoretical measurement line parallel with at least the first edge, with the second theoretical measurement line beginning from a second end of the metal construction component which is opposite the first end and extending along at least a portion of the length of the metal construction component, and neither the first indicia nor the second indicia extend along the full length of the metal construction component.

It is also disclosed that the portion of the length of the metal construction component is less than half the length or less than one fourth the length of the metal construction component.

It is also disclosed that at least a portion of the first plurality of indicium have been permanently applied to the metal construction component.

The specification also discloses that at least a portion of the first plurality of indicium are at least about 0.015 inches deep into at least one part of the metal construction component selected from the group consisting of the web, the first flange or the second flange.

The specification also discloses a method of continuously manufacturing the metal construction component of claim 1, wherein the method comprises the steps of: a) provisioning a metal ribbon for shaping into the metal construction component, b) placing an indicia comprised of a plurality of evenly spaced indicium upon the metal ribbon, c) shaping the metal ribbon into the metal construction component, d) cutting the metal construction component to a length.

DETAILED DESCRIPTION

This specification is best understood by referring to the Figures. Reference will now be made to the various Figures in which, unless otherwise noted, like numbers refer to like structures. As described herein and in the claims, the following numbers refer to the following structures as noted in the Figures.

100 refers to a metal stud, which is a metal construction component.
110 refers to a tape measure.
202 refers to a first flat.
204 refers to a second flat.
206 refers to a plank.
200 refers to a middle member of the metal stud, also known as a web.
205 refers to a side of the web opposite the channel.
210 refers to a first edge of a metal stud.
215 refers to a first side of the metal stud, also known as a first flange.
220 refers to a second edge of a metal stud.
225 refers to a second side of metal stud, also known as a second flange.
250 refers to the length of the metal stud.
260 refers to the width of the metal stud.
270 refers to the height of the metal stud.
280 refers to the first end of the metal stud.
290 refers to the second end of the metal stud.
300 refers to the indicia, which is a group of indicium, on the metal stud.
301 refers to a second set of indicia, on the side of the web opposite the channel.
310 refers to the theoretical measuring line of the metal stud and indicia.
311 refers to a second theoretical measuring line of the metal framing component associated with the second set of indicia on the side of the web opposite the channel.
320 refers to the indicia gap.
400 refers to metric indicia.
410 refers to the theoretical measurement line of the metal stud and indicia.
420 refers to the measurement gap.

Figure 1:
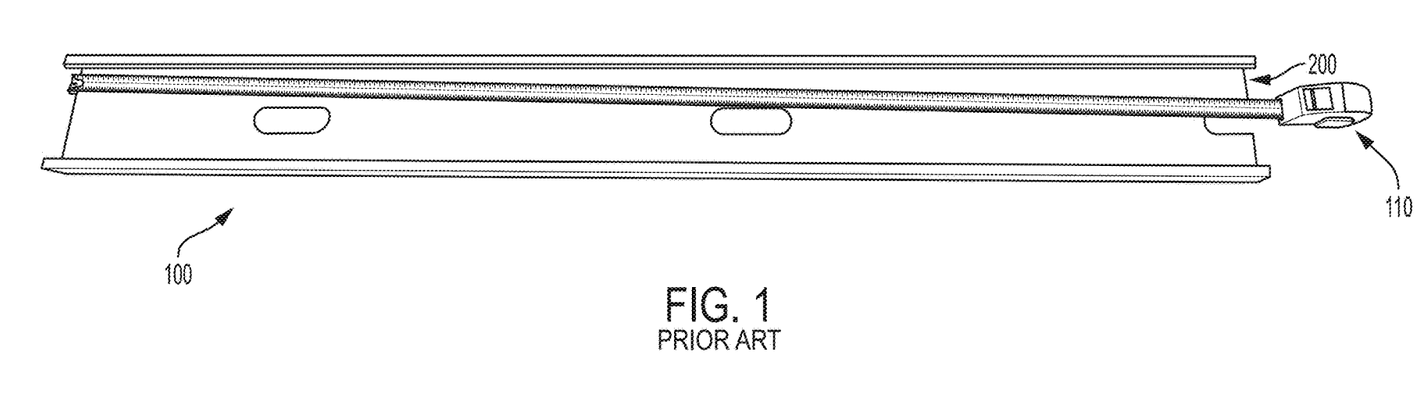
FIG. 1 depicts a perspective view of an embodiment of the prior art.

It has been discovered that the tape measure (110) and marking system currently used to cut a metal stud (100) for construction components as shown in FIG. 1 can be eliminated and made to be more accurate by placing measurement indicia designed as a ruler on at least a portion of the metal construction component, which in this embodiment, is a metal stud.

Figure 2:
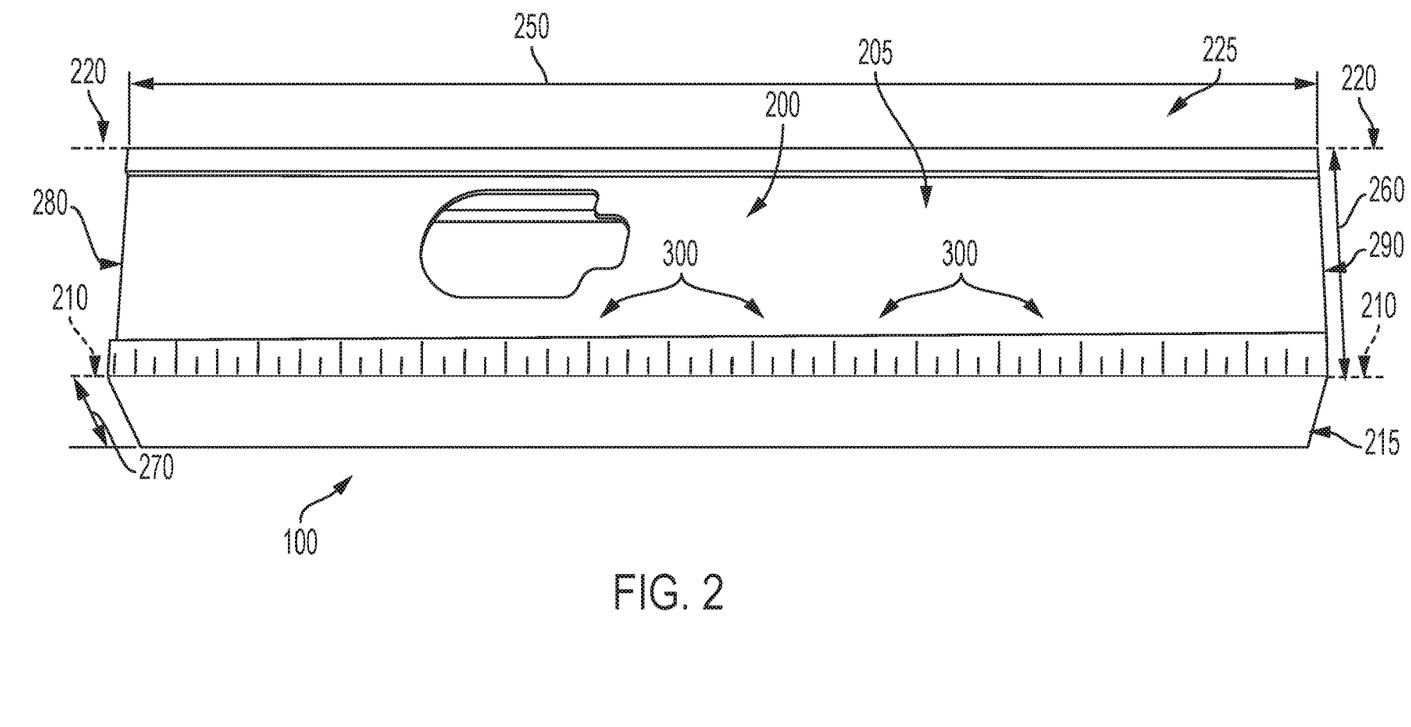
FIG. 2 is a perspective view of an embodiment of the invention.

One embodiment of this invention, as shown in FIG. 2, is to a metal construction component known as a metal framing component such as a metal stud (100) having an indicia (300) which is a plurality of indicium.

While described below in further detail relative to a metal stud, the use of indicia as described can be applied to construction components having a web with at least one straight edge with which to align the indicia.

Examples of these construction components, preferably metal components, are structural studs, structural track, non-load bearing studs, non-load bearing track, flat strap, header systems, J track, CT Studs, H Studs and right angles.

The metal stud (100) may have a middle member also known as a web (200), a first flange (215) and optionally a second flange (225), a length (250), a width (260) measured across the web, and a height (270). In some embodiments, the web may be divided into two or more sections referred to herein as the flat and the plank (206) as shown in FIG. 2. The plank may be located between two opposing sections of the flat, referred to as the first flat (202) and the second flat (204). As shown in FIG. 2, the plank may be located in a first plane which is different from a second plane of the flat (i.e.—the first flat and the second flat). The metal stud may also have a first end (280), a second end (290) opposite the first end, a second side opposite the first side, and at least a third side. The metal stud may also have a fourth side not shown in the drawings. This would be the channel side, which is the channel formed by the web and first and second flange.

The metal stud may also have a first edge (210), and a possible second edge (220). The first edge may be at the juncture of the first flange and web, and the second edge, if present, may be formed by the juncture of the second flange and the web.

The measurement indicia, or simply indicia, is made up of a plurality of indicium (individual indications). The indicium of the plurality of indicium are evenly spaced along a theoretical measurement line. The plurality of indicium are placed upon the metal construction component with the theoretical measurement line substantially parallel to one edge of the metal construction component. If the individual indicium are evenly spaced along the theoretical measurement line consistent with the spacing of a conventional distance measurement system, the plurality of indicium, or indicia, provide both an indication of measurement and the exact location where to cut the metal construction component. In this manner the plurality of indicium essentially form a ruler placed on the metal construction component.

A hash mark is one preferred indicium. The hash mark is perpendicular to the theoretical measurement line, which means the hash mark is also perpendicular to the edge of the metal construction component and parallel with the width of the metal construction component. In the case of most metal construction components, the hash mark indicium are perpendicular to both edges of the metal construction component.

The indicia may be located upon the inside or outside of the components of the metal construction component, which could include and are not limited to either or both sides of a web, a flange, both flanges, or combination thereof.

The utility of the indicia with the indicium evenly spaced according to a measurement convention along the edge of a metal construction component is demonstrated as follows: Assume, for example, a craftsperson has a metal construction component, i.e. a metal stud, which is 2 feet in length, and needs a smaller metal construction component, i.e. metal stud, of 11¼ inches in length. The traditional way to obtain this length is to use a tape measure to measure 11¼ inches from one end of the 2 foot stud, mark the stud and then cut it. This can lead to inaccuracies as the tape measure may not be precisely square along the length of the metal stud as shown in FIG. 1. However, if the 2 foot long metal construction component, i.e. the metal stud, had a series of indicium evenly spaced inch apart starting at either end or both ends of the metal stud starting point (0 inches) and extending along the edge for the entire two feet of the metal stud, the craftsperson merely places the stud under the saw at the 3rd indicium from the end and cuts a piece from the metal construction component measuring exactly ¾ of an inch from the end, leaving a component measuring 11¼ inches length. The indicia provide an exact location of where to cut.

In another example, the craftsperson may have a metal construction component, i.e. a metal stud, which is 12 feet in length, and needs a smaller metal construction component, i.e. metal stud, of 10 feet and ¾ inches in length. If the 12 foot long metal construction component, i.e. the metal stud, had a plurality of indicium evenly spaced ¼ inch apart starting at either end or both ends of the metal stud (starting point 0 inches, or the end of the metal stud) and extending along the edge for only two feet of the metal stud, the craftsperson merely places the stud under the saw at the 93$^{rd}$ indicium from the end and cuts a piece from the metal frame measuring exactly 1 foot and 11¼ inches length. This leaves the metal construction component measuring 10 feet and ¾ inches in length.

While two lines of indicia on opposing edges of a metal stud can be used, only one is needed as the metal studs are fabricated to be straight in length, that is the edges are parallel and the saw is set at the proper angle for the proper cut. (E.g. 0 Degrees for a cut perpendicular to the length of the metal stud.)

The length of the metal construction component, in this embodiment, a metal stud, may generally be of standard industry length, which for the United States customary measurement system is generally provided in feet increments of 4 feet, 5 feet, 6 feet, 7 feet, 8 feet, 9 feet, 10 feet, 11 feet, and 12 feet. However, embodiments as short as 2 feet or as long as 50 feet may be utilized. The metal stud length can therefore be in the ranges of 2 to 50 feet, 2 to 40 feet, 2 to 25 feet, 2 to 12 feet, 5 to 50 feet, 5 to 40 feet, 5 to 25 feet, 5 to 12 feet, 8 to 50 feet, 8 to 40 feet, 8 to 25 feet, and 8 to 12 feet.

Figure 3:
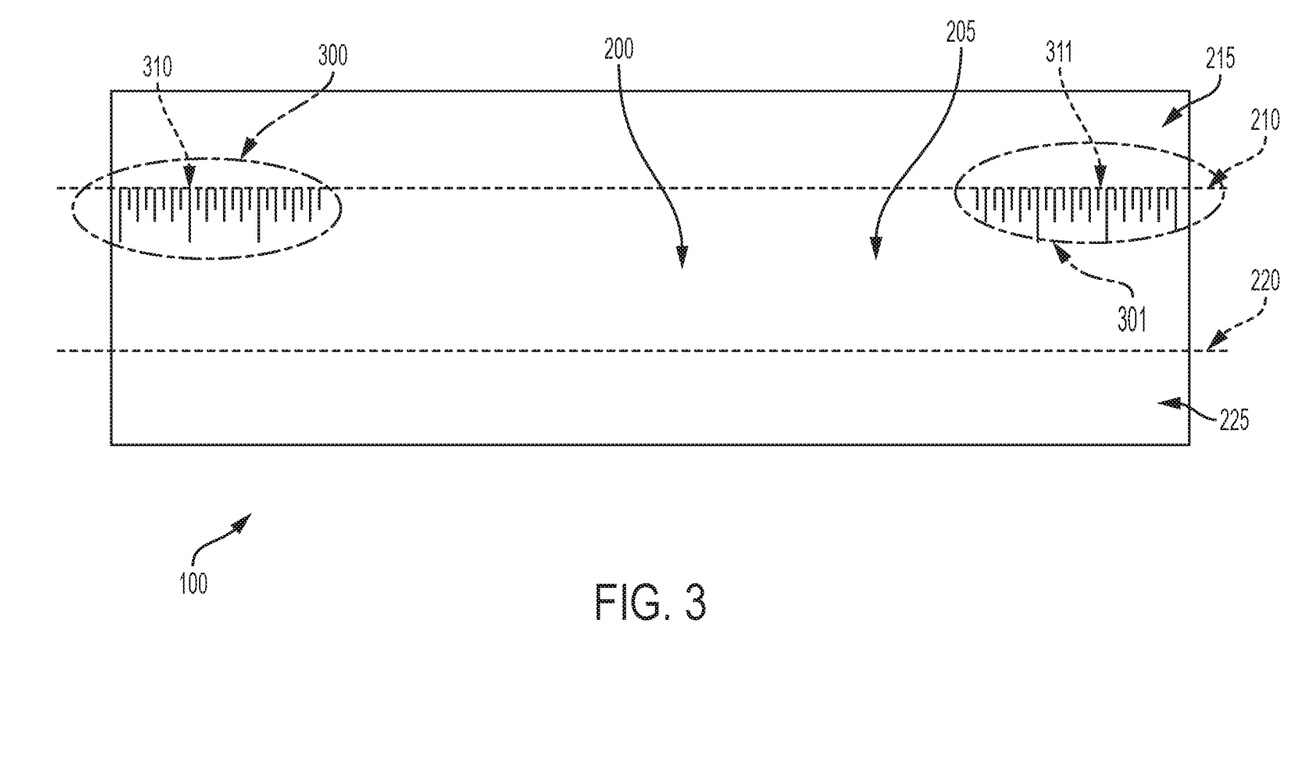
FIG. 3 is a close-up top view of one embodiment of the invention.
Figure 4:
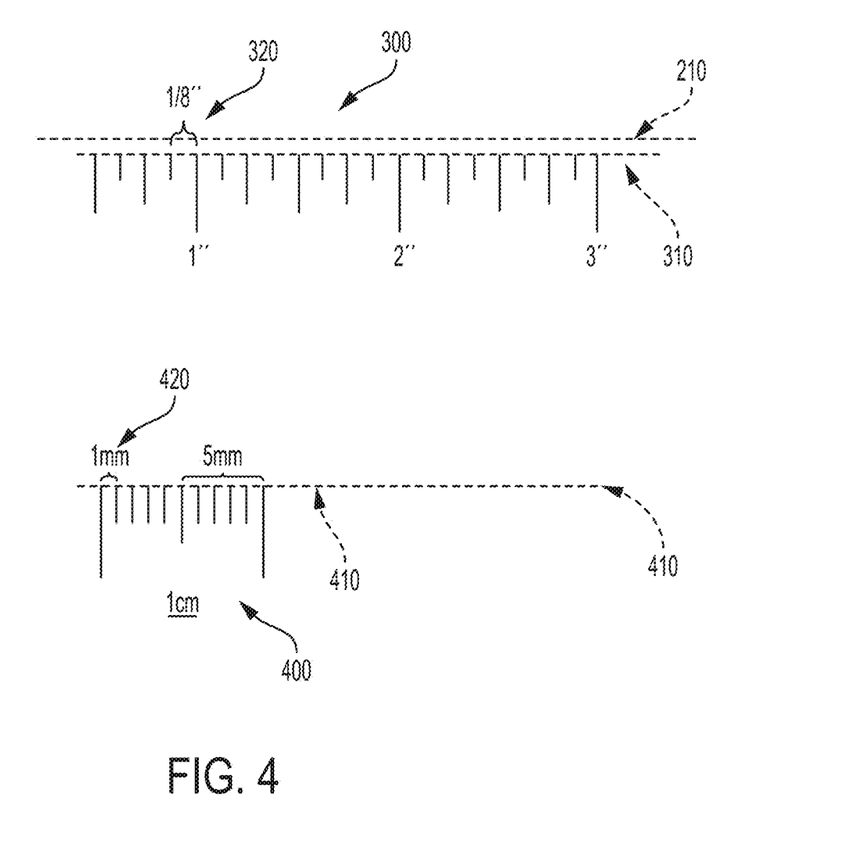
FIG. 4 is a blown up view of the indicia of the invention.

In a preferred embodiment, as shown in FIG. 3, the indicia (300) may be evenly spaced along a theoretical measurement line (310), or measurement line, which is substantially parallel to at least one of the first edge (210) and/or the second edge (220) with the indicia starting from either the first end (280) of the metal stud and/or the second end which is opposite the first end, of the metal stud. The line with which the measurement line (310) is parallel with is a straight line. Accordingly, if the measurement line (310) is to be parallel with the first edge (210), then the first edge is a straight line. As shown in FIG. 3, the theoretical measurement line (310) is superimposed upon the first edge (210). For the purposes of this specification, being parallel with or in parallel with also means the lines can be superimposed upon each other. In FIG. 4, the theoretical measurement line and the first edge are not on top each other—i.e., not superimposed upon each other.

In one embodiment there is at least a first indicia which begins from the first end of a metal construction component. This first indicia will be aligned on a first theoretical measurement line. The first indicia may be the only indicia on the metal construction component. The first theoretical measurement line will extend along at least a portion of the length of the metal construction component. It is possible in another embodiment that the first theoretical measurement line extends along the full length of the metal construction component. In this case there are first indicia on the whole length of the metal construction component.

In another embodiment there is a first indicia aligned on a first theoretical measurement line with the first theoretical measurement line beginning from the first end and a second indicia aligned on a second theoretical measurement line with the second theoretical measurement line beginning from the second end of the metal construction component opposite the first end. Each of the first indicia and the second indicia are aligned on their respective theoretical measurement line, with each theoretical measurement line extending along at least a portion of the length of the metal construction component.

In many embodiments, the indicia with its indicium evenly spaced on the theoretical measurement line which extends along at least a portion of the length of the metal stud will be parallel with either the first edge, the second edge, or both. This portion of the length bearing the indicia is generally less than half the length of the metal construction component, and more preferably less than one fourth the length of the metal construction component, with about 2 feet being the most preferred. The indicia function best when the indicia are aligned on the theoretical measurement line which extends at least one foot along the length of the metal stud. In some embodiments, the theoretical measurement line may also extend the entire length of the metal stud.

While the Figures show the indicia (300) arranged on the web, other embodiments may exist. For example embodiments may exist where the indicia are arranged on one or both of the flange(s) starting from the first edge (210) and/or the second edge (220). In other embodiments, the indicia may be arranged on one or both of the flange(s) starting from the edge opposite of the first edge and/or the second edge. In still other embodiments, the indicia may be arranged on one or both of the flange(s) starting from the first edge and/or the second edge, and may extend at least partially onto the web. In yet other embodiments, the indicia may be arranged on at least one of the first flat or the second flat. In still other embodiments, the indicia may be arranged on the plank. One of ordinary skill will also recognize that any combination of the above listed indicia positioning may be possible.

As shown in FIG. 4, there is a measurement gap (320 and 420), or space, between the individual indicium of the indicia and is also called the degree of resolution. This measurement gap or degree of resolution corresponds to a measurement system. The preferred measurement systems are the conventional measurement systems and are selected from the group consisting of the metric system (centimeters) and the United States customary system (inches) each of which are shown in FIG. 4. This measurement gap is determined from the center point of one indicium to the center point of an adjacent indicium as measured along the measurement line.

The degree of resolution for the indicium in the United States customary system could be one sixteenth (1/16) of an inch, one-eighth (1/8) of an inch, one-quarter (1/4) of an inch, one-half (1/2) of an inch, one inch, or one foot. As shown in FIG. 4, the measurement gap is 1/8 of an inch.

The degree of resolution for indicium corresponding to the metric system can be 50 millimeters, 25 millimeters, 10 millimeters, 8 millimeters, 6 millimeters, 5 millimeters, 4 millimeters, 2 millimeters, or 1 millimeter. This corresponds to 5 centimeters, 2.5 centimeters (approximately 1 inch), 1 centimeter, eight-tenths (8/10) of a centimeter, six-tenths (6/10) of a centimeter, five tenths (5/10) of a centimeter, four-tenths (4/10) of a centimeter, two-tenth (2/10) of a centimeter, and one-tenth (1/10) of a centimeter.

The size of the indicium may vary by that indicium's incremental distance from the end of the metal stud. An indicium's incremental distance is the number numeral one over a positive integer, provided that the positive integer is the smallest positive integer which when multiplied by the indicium's distance from the end of the metal stud measured in fractions yields a positive integer.

For example, an indicium 13/16 of an inch from the end has an incremental distance of 1/16 as 16 is the smallest positive integer which when multiplied by 13/16 yields a positive integer. Therefore the incremental distance of that indicium is a sixteenth of an inch.

Similar, an indicium 14/16 of an inch from the end has an incremental distance of 1/8 as 8 is the smallest positive integer which when multiplied by 14/16 yields a positive integer. Therefore the incremental distance of that an indicium is an eighth of an inch.

In United States customary system embodiments, the indicium corresponding to an incremental distance of 1 inch from the end may be the largest marks of the indicium with the indicium corresponding to an incremental distance of one-half inch from the end of the stud being smaller than the one inch indicium but larger than those indicium corresponding to an incremental distance of one-quarter inch. The indicium corresponding to only the one-quarter inch increments are larger than the indicium corresponding to the indicium corresponding to the one-eighth inch indicium, but smaller than those indicium corresponding to an incremental distance of one-half inch.

If the indicium are circles, the size is determined by the diameter. If the indicium are ellipses, the size is determined by one axis of the ellipse. If the indicium are hash marks the size may be determined by either the thickness or length of the hash mark.

Another embodiment comprises a combination of shapes. For example, circles could correspond with the foot mark, ellipsis correspond to the inch and different length hash marks for one half, one quarter and one eighth inch respectively. In this manner, the relative sizes of the indicium make the indicia characterized as ruler-like. It is also possible to employ the United States customary system where the longest hash mark corresponds to a foot.

In general, the size of the hash marks corresponding to a larger incremental distance from the end are larger than the size of hash marks corresponding to a smaller incremental distance.

It should be noted the largest hash mark of the indicia is preferably aligned with the end of the stud.

In one of the embodiments, the indicium are dots, or circles, which may vary in size according to the increment distance as previously described.

The indicium may also include numerals or may be void of numerals or may be comprised of numeric and non-numeric indicators.

In the embodiment of the metal construction component, the indicium can be etched on to the metal construction component, embossed on to the metal construction component, carved into the metal construction component, adhered to the metal construction component, ink printed on the metal construction component, or painted on the metal construction component. All indicium marking methods would preferably be permanently applied, and factory applied as opposed to field applied. For the purposes of this specification, the term permanently applied means that the indicium cannot be removed by the application of a cloth wash rag soaked in only soap and water or only detergent and water for 5 minutes.

The hash marks or dots need to be visible by the user in the field. Typically this is from a distance of 5 feet and visible through construction site dust and dirt. This is preferably accomplished when the indicia is about at least 0.015 inches deep into the web or flange.

When making the metal stud one may continuously manufacture the metal stud, by a. provisioning a metal ribbon for shaping into the metal construction component, b. placing the indicia upon the metal ribbon, c. shaping the metal ribbon into the metal construction component, and d. cutting the metal construction component to the length.

What is claimed is:

1. A metal construction component (100) having a length (250) and a width (260) comprising:
    a first end (280),
    a channel formed by a web (200) having a first flat (202), a second flat (204), and a plank (206) located between the first flat and the second flat with said plank being in a first plane which is different from a second plane of the first flat and the second flat, and said web further having at least a first edge (210),
    a first flange, a second flange, and
    a first indicia (300) on a side of at least one of the first flat or the second flat opposite the channel;
    with the first indicia comprised of a first plurality of indicium evenly spaced along a first theoretical measurement line (310),
    with the first theoretical measurement line substantially parallel to at least the first edge, and with said first theoretical measurement line beginning from the first end and extending along at least a portion of the length.

2. The metal construction component of claim 1, wherein the length is in a range of about 2 to about 50 feet.

3. The metal construction component of claim 2, wherein the first indicia has a degree of resolution between individual indicium of the first plurality of indicium and the degree of resolution is a measurement gap between the individual indicium selected from the group consisting of the metric system and the United States customary system.

4. The metal construction component of claim 3, wherein the degree of resolution is the United States customary system and the measurement gap is selected from the group consisting of one foot, one inch, one-half of an inch, one-quarter of an inch, one-eighth of an inch, and one-sixteenth of an inch.

5. The metal construction component of claim 3, wherein the degree of resolution is the metric system and the measurement gap is selected from the group consisting of 50 centimeters, 25 centimeters, one centimeter, five millimeters, two millimeters, and one millimeter.

6. The metal construction component of claim 1, wherein at least a portion of the first plurality of the indicium of the first indicia comprise hash marks oriented perpendicular to the theoretical measurement line or at least a portion of the first plurality of indicium comprise dots arranged on the theoretical measurement line, and the first indicia occur at an incremental distance from the first end of the metal construction component from where the first indicia begins.

7. The metal construction component of claim 6, wherein the at least a portion of the first plurality of indicium are hash marks having a hash mark length corresponding to the incremental distance of each individual hash mark from the first end of the metal construction component from which the first indicia begins.

8. The metal construction component of claim 7, wherein the hash mark lengths corresponding to a largest incremental distance are the same length and the hash mark lengths corresponding to a smaller incremental distance are shorter than the hash mark lengths corresponding to the hash mark lengths corresponding to the longest incremental distance.

9. The metal construction component of claim 1, wherein the first theoretical measurement line extends the length of the metal construction component.

10. The metal construction component of claim 6, wherein the first theoretical measurement line extends the length of the metal construction component.

11. The metal construction component of claim 1, further comprising a second indicia arranged on a second theoretical measurement line parallel with at least the first edge, with the second theoretical measurement line beginning from a second end of the metal construction component which is opposite the first end and extending along at least a portion of the length of the metal construction component, and neither the first indicia nor the second indicia extend along the full length of the metal construction component.

12. The metal construction component of claim 6, further comprising a second indicia arranged on a second theoretical measurement line parallel with at least the first edge with the second theoretical measurement line beginning from a second end of the metal construction component which is opposite the first end and extending at least a portion of the length of the metal construction component, and neither the first indicia nor the second indicia extend along the full length of the metal construction component.

13. The metal construction component of claim 1, wherein the portion of the length is less than half the length of the metal construction component.

14. The metal construction component of claim 6, wherein the portion of the length is less than half the length of the metal construction component.

15. The metal construction component of claim 1, wherein the portion of the length is less than one fourth the length of the metal construction component.

16. The metal construction component of claim 1, wherein at least a portion of the first plurality of indicium have been permanently applied to the metal construction component.

17. The metal construction component of claim 6, wherein at least a portion of the first plurality of indicium have been permanently applied to the metal construction component.

18. The metal construction component of claim 1, wherein the at least a portion of the first plurality of indicium are at least about 0.015 inches deep into the metal construction component.

19. The metal construction component of claim 6, wherein the at least a portion of the first plurality of indicium are at least about 0.015 inches deep into the metal construction component.

20. The metal construction component of claim 1, wherein at least a portion of the first indicia extend onto at least one of the first flange, the second flange, or the plank.

21. A method of continuously manufacturing the metal construction component of claim 1, wherein the method comprises the steps of:
   a. provisioning a metal ribbon for shaping into the metal construction component,
   b. placing the first indicia comprised of a plurality of evenly spaced indicium upon the metal ribbon at a location which will be on the side of the web opposite the channel after the metal ribbon is shaped,
   c. shaping the metal ribbon into the metal construction component, and
   d. cutting the metal construction component to the length.

* * * * *